(12) United States Patent
Nakasato et al.

(10) Patent No.: US 11,331,954 B2
(45) Date of Patent: May 17, 2022

(54) HEAVY DUTY TIRE

(71) Applicant: BRIDGESTONE CORPORATION, Tokyo (JP)

(72) Inventors: Reo Nakasato, Tokyo (JP); Taiki Sato, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 47 days.

(21) Appl. No.: 16/770,948

(22) PCT Filed: Jul. 20, 2018

(86) PCT No.: PCT/JP2018/027379
§ 371 (c)(1),
(2) Date: Jun. 9, 2020

(87) PCT Pub. No.: WO2019/116625
PCT Pub. Date: Jun. 20, 2019

(65) Prior Publication Data
US 2021/0188009 A1    Jun. 24, 2021

(30) Foreign Application Priority Data

Dec. 12, 2017 (JP) .............................. JP2017-237703

(51) Int. Cl.
*B60C 11/01* (2006.01)
*B60C 9/20* (2006.01)

(52) U.S. Cl.
CPC ............... *B60C 11/01* (2013.01); *B60C 9/20* (2013.01); *B60C 2011/013* (2013.01); *B60C 2200/06* (2013.01)

(58) Field of Classification Search
CPC .................................................. B60C 2011/013
See application file for complete search history.

(56) References Cited

U.S. PATENT DOCUMENTS

| 2,972,368 A | 2/1961 | Williams |
| 4,977,942 A | 12/1990 | Ochiai |

(Continued)

FOREIGN PATENT DOCUMENTS

| CN | 101722796 A | 6/2010 |
| CN | 102765302 A | 11/2012 |

(Continued)

OTHER PUBLICATIONS

Machine Translation: JP-2000108614-A, Takatsuki, Tetsuya, (Year: 2021).*

(Continued)

*Primary Examiner* — Kendra Ly
(74) *Attorney, Agent, or Firm* — Solaris Intellectual Property Group, PLLC

(57) ABSTRACT

A heavy duty tire includes a recess portion that is formed in a buttress portion, that opens toward a tire outside, and that includes a bottom portion, and a first air entry/exit promotion portion configured to promote entry and exit of air with respect to the bottom portion, and that includes a slope running from the bottom portion toward a tire surface such that a depth of the slope from the tire surface gradually decreases. A width dimension of the first air entry/exit promotion portion on a recess portion side is set smaller than a width dimension of the air entry/exit promotion portion on the opposite side to the recess portion.

10 Claims, 9 Drawing Sheets

(56) References Cited

U.S. PATENT DOCUMENTS

| | | | |
|---|---|---|---|
| 2008/0105348 A1 | 5/2008 | Byrne et al. | |
| 2009/0165910 A1 | 7/2009 | Shimizu | |
| 2011/0290388 A1 | 12/2011 | Radulescu | |
| 2013/0299052 A1 | 11/2013 | Minowa | |
| 2014/0209227 A1 | 7/2014 | Maeda | |
| 2016/0200148 A1 | 7/2016 | Nomura | |
| 2018/0043737 A1 | 2/2018 | Akashi | |

FOREIGN PATENT DOCUMENTS

| | | | |
|---|---|---|---|
| CN | 103370211 A | | 10/2013 |
| CN | 103963571 A | | 8/2014 |
| CN | 105473347 A | | 4/2016 |
| JP | H02-68205 A | | 3/1990 |
| JP | H04-2708 U | | 1/1992 |
| JP | 2000-043522 A | | 2/2000 |
| JP | 2000-062415 A | | 2/2000 |
| JP | 2000103206 A | * | 4/2000 |
| JP | 2000108614 A | * | 4/2000 |
| JP | 2001-219711 A | | 8/2001 |
| JP | 2004-066851 A | | 3/2004 |
| JP | 2004-090798 A | | 3/2004 |
| JP | 2005-161978 A | | 6/2005 |
| JP | 2005-271726 A | | 10/2005 |
| JP | 2009-542528 A | | 12/2009 |
| JP | 2010-132045 A | | 6/2010 |
| JP | 2010132043 A | * | 6/2010 |
| JP | 2011-68349 A | | 4/2011 |
| JP | 2011068349 A | * | 4/2011 |
| JP | 5129855 B2 | | 1/2013 |
| JP | 2017-030639 A | | 2/2017 |
| WO | 2007/148694 A1 | | 12/2007 |
| WO | 2016/132971 A1 | | 8/2016 |

OTHER PUBLICATIONS

Machine Translation: JP-2000103206-A, Takatsuki, Tetsuya, (Year: 2021).*

Machine Translation: JP-2011068349-A, Shibano, Keizo, (Year: 2021).*

Machine Translation: JP-2010132043-A, Yamanaka, Takaya, (Year: 2021).*

International Search Report issued in International Application No. PCT/JP2018/027379 dated Oct. 23, 2018.

Extended European Search Report dated Jul. 28, 2021, issued in corresponding EP Patent Application No. 18888403.5.

Search Report of the Chinese office action dated Sep. 9, 2021, from the SIPO in a Chinese patent application No. 2018800794394 corresponding to the instant patent application.

Search Report of the Chinese office action dated Mar. 15, 2022, from the SIPO in a Chinese patent application No. 2018800794394 corresponding to the instant patent application.

* cited by examiner

HEAVY DUTY TIRE

TECHNICAL FIELD

The present disclosure relates to a heavy duty tire.

BACKGROUND ART

Due to their load bearing capability and size, heavy duty tires are liable to experience a rise in temperature in the vicinity of a buttress portion. The buttress portion undergoes repeated distortion as it repeatedly contacts and moves away from the road surface during travel, causing heat to be generated in the buttress portion. Consideration has therefore been given to forming recess portions in such a buttress portion such that air flows into the recess portions and cools the buttress portion. A tire disclosed in Japanese National-Phase Publication 2009-542528 is an example of a tire in which recess portions are formed in a buttress portion.

SUMMARY OF INVENTION

Technical Problem

Forming recess portions in the buttress portion enables the buttress portion to be cooled to a certain extent. However, larger loads result in greater distortion and thus increase the amount of heat generated, and there is therefore demand for improved cooling capability.

In consideration of the above circumstances, an object of the present disclosure is to provide a heavy duty tire with improved buttress portion cooling capability.

Solution to Problem

A heavy duty tire according to a first aspect includes a recess portion that is formed at a buttress portion, that opens toward an outside of the tire, and that includes a bottom portion, and an air entry/exit promotion portion configured to promote entry and exit of air into and from the bottom portion, the air entry/exit promotion portion includes a slope that extends from the bottom portion toward a tire surface such that a depth of the slope from the tire surface gradually decreases. A width dimension of the air entry/exit promotion portion at a recess portion side is smaller than a width dimension of the air entry/exit promotion portion at an opposite side from the recess portion side.

As the heavy duty tire rotates, a difference in speed arises between the tire surface and the surrounding air, causing air to flow into the recess portion formed at the buttress portion. The air entry/exit promotion portion includes the slope extending from the bottom portion toward the tire surface such that the depth of the slope from the tire surface gradually decreases, and the air entry/exit promotion portion is configured to promote entry and exit of air into and from the bottom portion. Accordingly, air flowing near to the recess portion readily flows along the slope toward the bottom portion of the recess portion, enabling an air-cooling effect at the bottom portion of the recess portion to be improved by the air flowing along the bottom portion of the recess portion. Providing the recess portion at the buttress portion in this manner enables the buttress portion to be effectively cooled as the heavy duty tire rotates.

Moreover, in the heavy duty tire according to the first aspect, the width dimension of the air entry/exit promotion portion at the recess portion side is smaller than the width dimension of the air entry/exit promotion portion at the opposite side from the recess portion side. The air entry/exit promotion portion is thereby able to increase a speed at which air is discharged into the recess portion to a greater speed than a speed at which air is taken in from the tire surface side. This enables the speed at which air flows along the bottom portion of the recess portion to be increased, thus further promoting the inflow of air and further enhancing the cooling effect. The buttress portion can accordingly be cooled more effectively than in a case in which the recess portion is not provided with the air entry/exit promotion portion.

Advantageous Effects of Invention

As described above, the heavy duty tire of the present disclosure exhibits the excellent advantageous effect of enabling cooling capability at the buttress portion to be improved.

DESCRIPTION OF EMBODIMENTS

Explanation follows regarding a heavy duty tire 10 according to an exemplary embodiment of the present invention, with reference to FIG. 1 to FIG. 5. With the exception of air-cooled portions 32, described later, the structure of the heavy duty tire 10 of the present exemplary embodiment is configured similarly to a typical heavy duty pneumatic tire.

Figure 1:
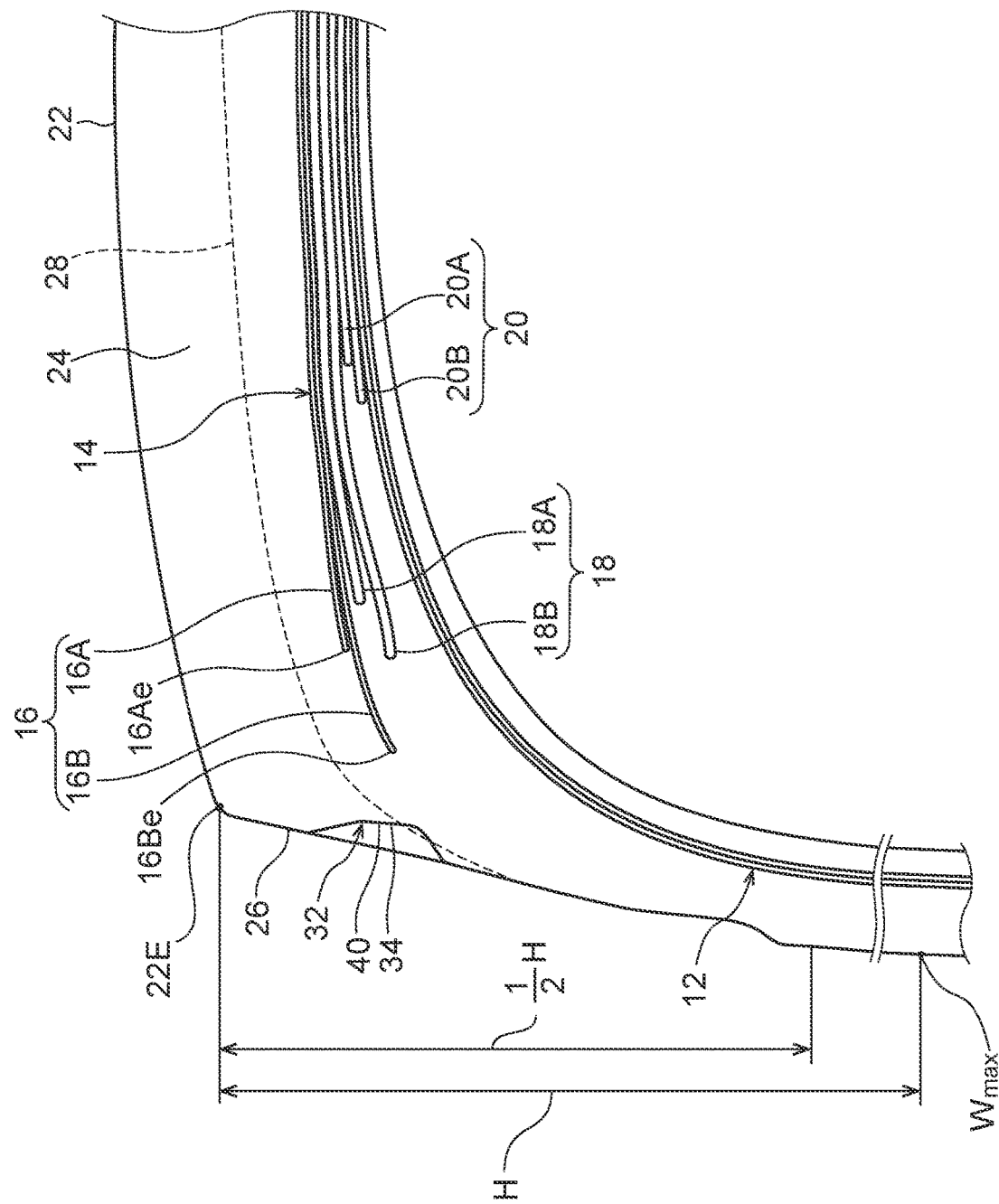
FIG. 1 is a cross-section illustrating the vicinity of a buttress portion of a heavy duty tire according to an exemplary embodiment of the present invention.

As illustrated in FIG. 1, the heavy duty tire 10 includes a carcass 12 that spans between a pair of non-illustrated bead cores.

Belt Configuration

A belt 14 is laid at an outer side in a tire radial direction of the carcass 12. The belt 14 includes plural belt layers. Specifically, the heavy duty tire 10 according to a first exemplary embodiment includes a protective belt layer 16 configured of two protective belts 16A, 16B, a main intersecting belt layer 18 configured of two main intersecting belts 18A, 18B, and a small intersecting belt layer 20 configured of two small intersecting belts 20A, 20B. Note that the protective belts 16A, 16B, the main intersecting belts 18A, 18B, and the small intersecting belts 20A, 20B each have a typical structure in which plural cords arrayed parallel to each other are coated by covering rubber.

The main intersecting belt layer 18 is laid at an outer side in the tire radial direction of the small intersecting belt layer 20, and the protective belt layer 16 is laid at an outer side in the tire radial direction of the main intersecting belt layer 18.

As an example, in the heavy duty tire 10 of the present exemplary embodiment, an angle formed by the cords configuring the small intersecting belt layer 20 with respect to a tire circumferential direction is from 4° to 10°, an angle formed by the cords configuring the main intersecting belt layer 18 with respect to the tire circumferential direction is from 18° to 35°, and an angle formed by the cords configuring the protective belt layer 16 with respect to the tire circumferential direction is from 22° to 33°.

Explanation follows regarding widths of the respective belt layers making up the belt 14 of the present exemplary embodiment.

A width of the small intersecting belt 20A, which is at an outer side in the tire radial direction of and adjacent to the small intersecting belt 20B that is located at the innermost side in the tire radial direction, is formed slightly narrower than a width of the small intersecting belt 20B.

A width of the main intersecting belt 18B, which is at an outer side in the tire radial direction of and adjacent to the small intersecting belt 20A, is formed wider than the widths of each of the small intersecting belts 20A, 20B.

A width of the main intersecting belt 18A, which is at an outer side in the tire radial direction of and adjacent to the main intersecting belt 18B, is formed wider than the widths of each of the small intersecting belts 20A, 20B, but narrower than the width of the main intersecting belt 18B.

A width of the protective belt 16B, which is at an outer side in the tire radial direction of and adjacent to the main intersecting belt 18A is formed wider than the widths of each of the small intersecting belts 20A, 20B and the main intersecting belts 18A, 18B.

A width of the protective belt 16A that is at an outer side in the tire radial direction of and adjacent to the protective belt 16B and positioned at the outermost side of the belt 14 is formed narrower than the widths of each of the protective belt 16B and the main intersecting belt 18B, but wider than the respective widths of the small intersecting belts 20A, 20B and the main intersecting belt 18A. The protective belt 16A is laid at the outermost side in the tire radial direction of the plural belt layers. Note that the protective belt 16A is an example of an outermost belt ply in the tire radial direction.

The protective belt 16B that configures the fifth belt as counted from an inner side in the tire radial direction is formed with the maximum width in the belt 14. A tire width direction end portion 16Be of the protective belt 16B is laid at the outermost side in the tire width direction. The protective belt 16B is an example of a maximum width belt ply.

Tread rubber 24 configuring a tread 22 is laid at an outer side in the tire radial direction of the belt 14. The tread rubber 24 extends along the carcass 12 toward an outer sides in the tire width direction of the belt 14, and parts of the tread rubber 24 laid at the tire width direction outer sides of the belt 14 configure part of a buttress portion 26.

The buttress portion 26 of the present exemplary embodiment refers to a tire outer side region spanning from a position located ½×H from a tire maximum width portion Wmax to a ground contact edge 22E, H being a dimension in the tire radial direction between the tire maximum width portion Wmax and the ground contact edge 22E of the tread 22.

The ground contact edge 22E of the tread 22 is defined under conditions in which the heavy duty tire 10 is fitted to a standard rim as specified in the 2017 Japanese Automobile Tire Manufacturers Association (JATMA) Year Book, and is filled to an air pressure of 100% internal pressure (maximum pressure) corresponding to the maximum load capacity (the load given in bold in the internal pressure/load capacity correspondence table) for the applicable size and ply rating specified in the JATMA Year Book, such that heavy duty tire 10 is at its maximum load bearing capacity. Note that in cases in which TRA or ETRTO standards apply in the region of use or manufacture, the applicable standards are followed.

Figure 2:
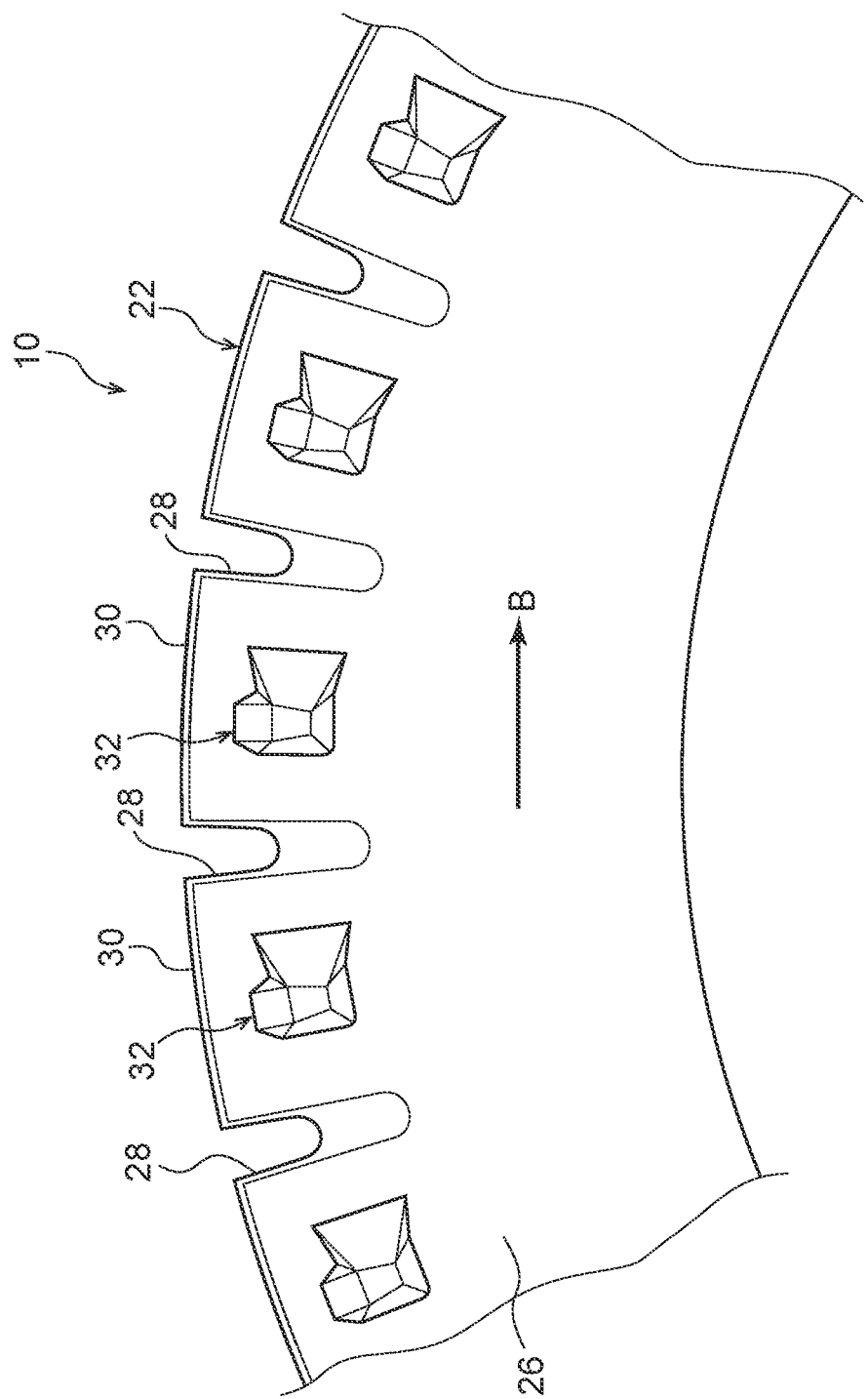
FIG. 2 is a side view illustrating the vicinity of a buttress portion of a heavy duty tire according to an exemplary embodiment of the present invention.

Plural lug grooves 28 are formed at the tread 22 of the heavy duty tire 10 around a tire circumferential direction. The lug grooves 28 formed at the tread 22 extend further toward outer sides in the tire width direction than the ground contact edges 22E of the tread 22. As illustrated in FIG. 2, end portions of the lug grooves 28 open at the buttress portions 26 of the heavy duty tire 10. Note that in the present exemplary embodiment, land portions formed between one and another of the lug grooves 28 that are adjacent in the tire circumferential direction are referred to as lug blocks 30.

Figure 3:
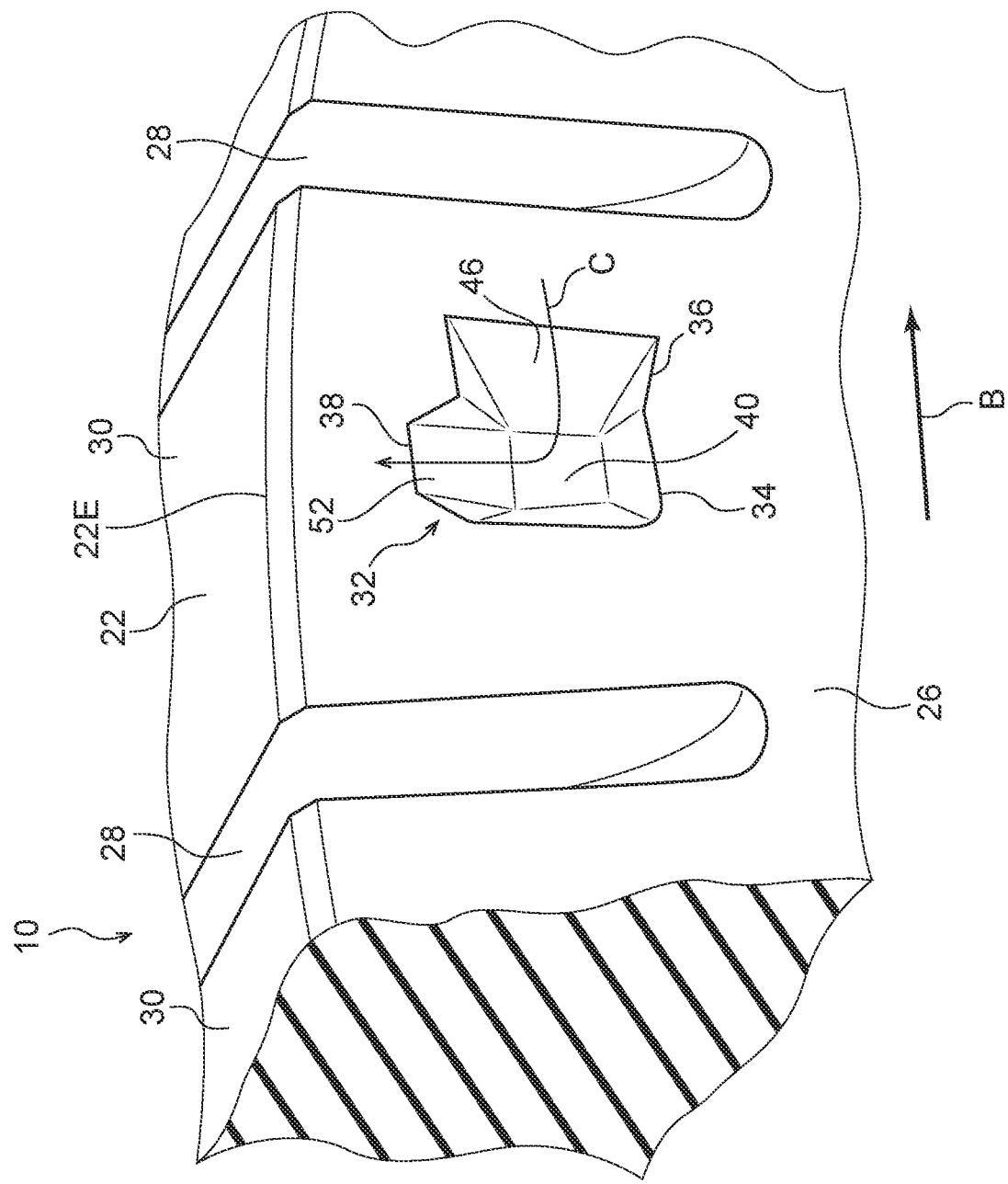
FIG. 3 is a perspective view illustrating the vicinity of a buttress portion of a heavy duty tire according to an exemplary embodiment of the present invention.

As illustrated in FIG. 1 to FIG. 3, the concave air-cooled portions 32 are formed at the buttress portions 26. In the present exemplary embodiment, the air-cooled portions 32 are formed at side faces of the respective lug blocks 30 partitioned by the lug grooves 28.

Detailed Configuration of Air-Cooled Portion

Figure 4:
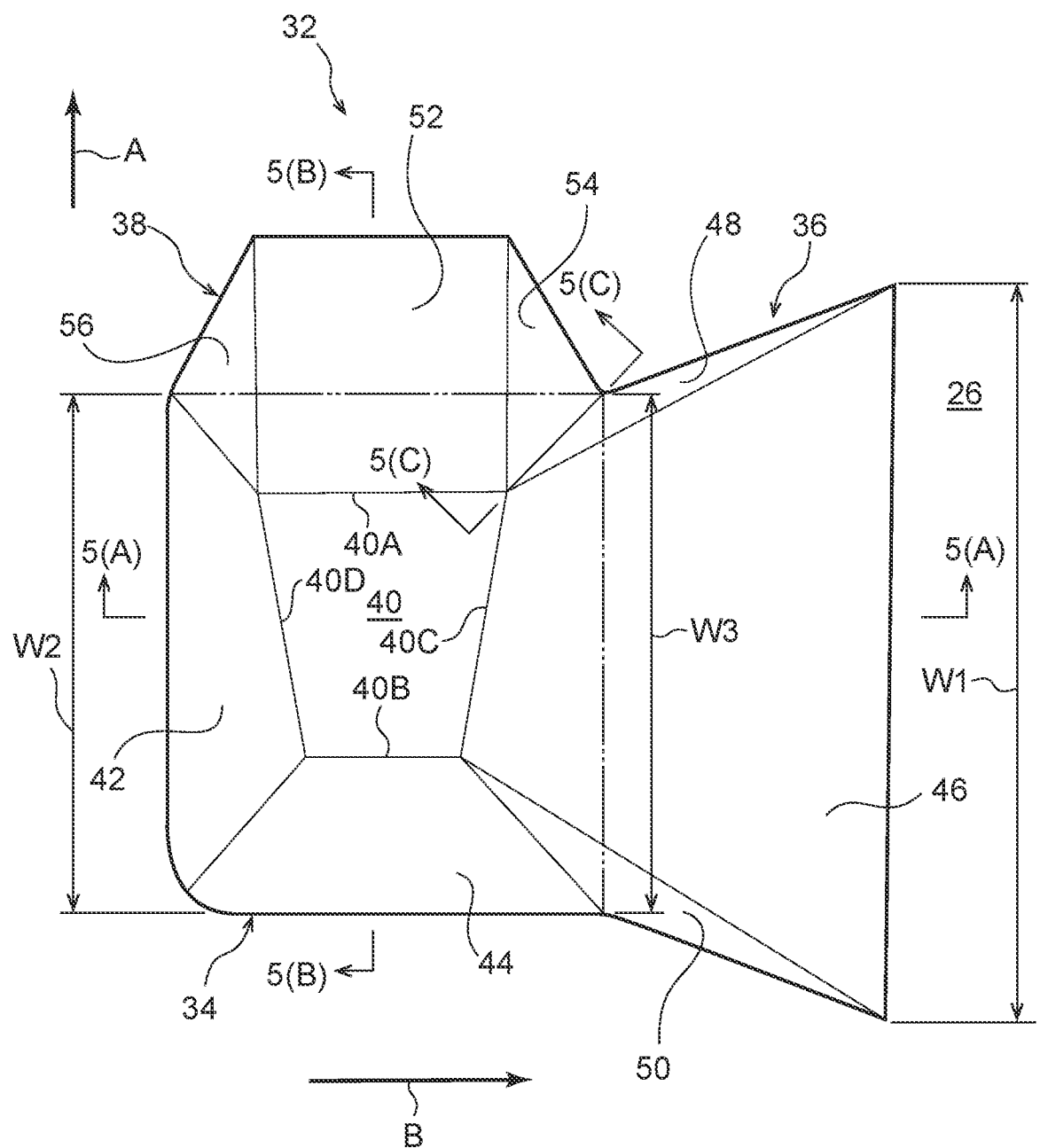
FIG. 4 is a plan view illustrating an air-cooled portion provided at a buttress portion.

As illustrated in FIG. 4, each of the air-cooled portions 32 is configured including a recess portion 34, a first air entry/exit promotion portion 36 disposed adjacent to the recess portion 34, and a second air entry/exit promotion portion 38. The first air entry/exit promotion portion 36 and the second air entry/exit promotion portion 38 are examples of air entry/exit promotion portions.

Detailed Configuration of Recess Portion

First, explanation follows regarding the recess portion 34.

As illustrated in FIG. 4, in plan view as viewed along a tire axial direction, the recess portion 34 includes a bottom portion 40 that has a trapezoidal shape in which a base 40A at an outer side in the tire radial direction (arrow A direction side) has a greater width than an upper side 40B at an inner side in the tire radial direction. Note that the base 40A and the upper side 40B are parallel to a direction tangential to the tire circumferential direction (arrow B direction), and a side 40C of the bottom portion 40 at a tire rotation direction front side (arrow B direction side) and a side 40D of the bottom portion 40 at the opposite side from the tire rotation direction front side are inclined with respect to the tire radial direction (arrow A direction).

Note that although the bottom portion 40 is trapezoidal shaped in the present exemplary embodiment, the bottom portion 40 may be another polygonal shape such as a square, rectangular, or triangular shape, or may be circular or elliptical in shape.

Figure 5A:
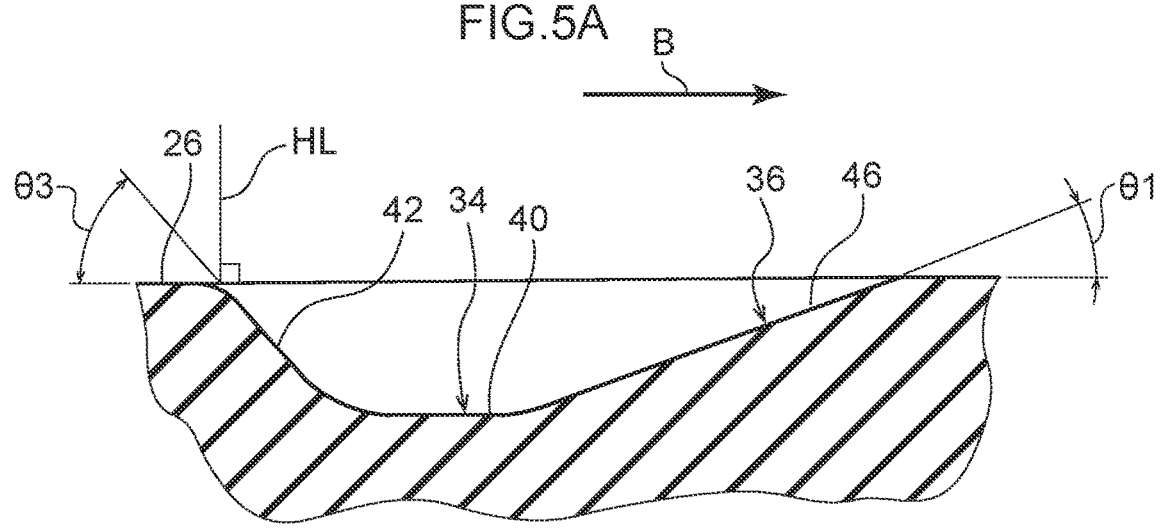
FIG. 5A is a cross-section of the air-cooled portion illustrated in FIG. 4 as sectioned along line 5A-5A.
Figure 5B:
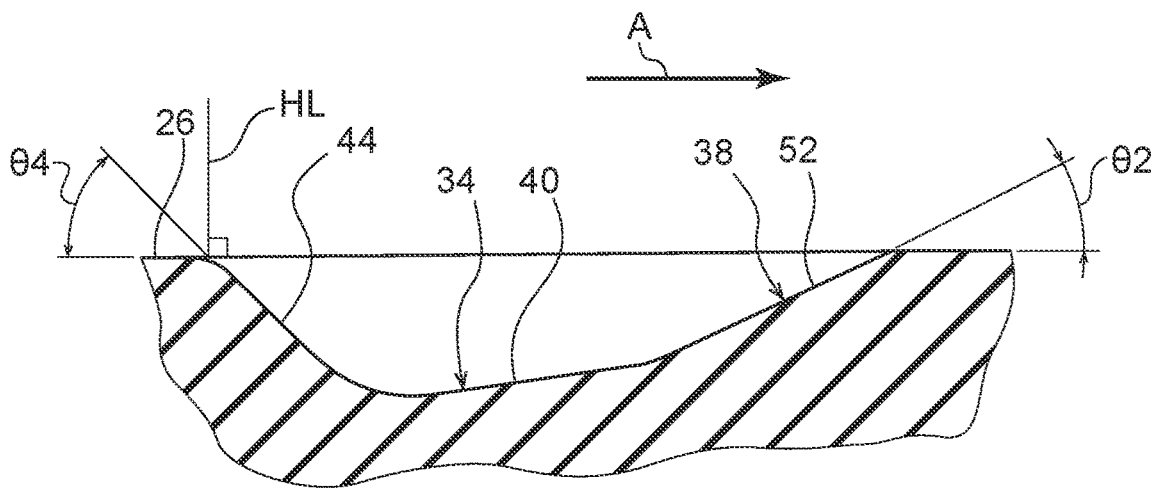
FIG. 5B is a cross-section of the air-cooled portion illustrated in FIG. 4 as sectioned along line 5B-5B.

Although a depth of the bottom portion 40 is uniform along the tire rotation direction as illustrated in FIG. 5A, the bottom portion 40 is inclined such that its depth gradually becomes shallower on progression from the inner side toward the outer side in the tire radial direction (arrow A direction side) as illustrated in FIG. 5B. Note that the bottom portion 40 may also be inclined with respect to a direction running along the tire rotation direction. Alternatively, the bottom portion 40 may have a uniform depth in a direction running along the tire radial direction (arrow A).

As illustrated in FIG. 1, in the recess portion 34 of the present exemplary embodiment, the bottom portion 40 is disposed at an outer side in the tire width direction of the end portion 16Be of the protective belt 16B, this being formed with the maximum width in the belt 14. In the present exemplary embodiment, the tire width direction end portion 16Be of the protective belt 16B is positioned at an inner side in the tire width direction of a central portion in the tire radial direction of the recess portion 34. More specifically, the end portion 16Be is disposed between the base 40A and the upper side 40B of the bottom portion 40 (see FIG. 4) so as to be closer to the upper side 40B.

As illustrated in FIG. 4, a recess sidewall 42 configuring part of the recess portion 34 is formed at the opposite side of the bottom portion 40 from the tire rotation direction front side (arrow B direction side). A recess sidewall 44 configuring another part of the recess portion 34 is formed at an inner side in the tire radial direction of the bottom portion 40 (on the opposite side to the arrow A direction).

As illustrated in FIG. 5A, the recess sidewall 42 is inclined with respect to a normal line HL that runs perpendicular to the surface of the buttress portion 26. As illustrated in FIG. 5B, the recess sidewall 44 is also inclined with respect to a normal line HL that runs perpendicular to the surface of the buttress portion 26. The recess portion 34 is thereby formed so as to widen on progression from the bottom portion 40 toward the tire outer side.

First Air Entry/Exit Promotion Portion

Next, explanation follows regarding the first air entry/exit promotion portion 36.

As illustrated in FIG. 4 and FIG. 5A, the first air entry/exit promotion portion 36 is disposed at the front side the in the tire rotation direction (arrow B direction side) of the recess portion 34. The first air entry/exit promotion portion 36 has a trapezoidal shape in plan view, and is a concave portion including a slope 46 that is inclined from the surface of the buttress portion 26 at the tire rotation direction front side (arrow B direction side) toward the bottom portion 40 of the recess portion 34. Note that the slope 46 connects smoothly to the bottom portion 40. The slope 46 is an inclined face running from the bottom portion 40 toward the tire surface such that a depth of the slope 46 from the tire surface gradually decreases.

Note that although in the present exemplary embodiment an example is given in which the slope 46 has a trapezoidal shape in plan view, the slope 46 may be formed with another polygonal shape in plan view, depending on the inclination direction of the bottom portion 40 (the extension direction of the side 40C), and the surface profile of the buttress portion 26.

A sidewall 48 that has a steeper incline than the slope 46 is formed at an outer side in the tire radial direction (arrow A direction side) of the slope 46, and a sidewall 50 that has a steeper incline than the slope 46 is formed at an inner side in the tire radial direction of the slope 46.

As illustrated in FIG. 4, a width dimension (a dimension in a direction intersecting the incline direction of the slope 46) of the first air entry/exit promotion portion 36 at a recess portion 34 side is formed relatively shorter than a width dimension of the first air entry/exit promotion portion 36 at the tire rotation direction front side (the arrow B direction side; the opposite side from the recess portion 34), such that the width of the first air entry/exit promotion portion 36 gradually decreases on progression from the tire rotation direction front side toward the recess portion 34. Note that the width dimension of the slope 46 at the recess portion 34 side is also formed relatively smaller than a width dimension of the slope 46 on the tire rotation direction front side.

Furthermore, in the present exemplary embodiment, a width W3 (width of a portion connected to the recess portion 34, as measured along the tire radial direction) of the first air entry/exit promotion portion 36 at the recess portion 34 side as measured at the tire surface is set so as to be the same as a (tire radial direction) width dimension W2 of the recess portion 34 at the tire surface. Note that the double-dotted dashed lines (imaginary lines) in FIG. 4 indicate the extent of an opening of the recess portion 34 at which the first air entry/exit promotion portion 36 and the second air entry/exit promotion portion 38 are not formed thereto.

As illustrated in FIG. 5A and FIG. 5B, the slope 46 has a gentler incline than the recess sidewall 42 and the recess sidewall 44 of the recess portion 34. An incline angle θ1 of the slope 46 with respect to the surface of the buttress portion 26 is preferably within a range of from 5° to 45°. If the incline angle θ1 were greater than 45°, it would be difficult to redirect air flowing along the tire surface so as to follow the slope 46. However, if the average incline angle of the slope 46 with respect to the tire surface were smaller than 5°, the cooling effect would be diminished. Note that the incline angle θ1 is more preferably set within a range of from 5° to 30°, and still more preferably set within a range of from 15° to 25°. Note that in cross-section the slope 46 forms a straight line running from the side 40C to the surface of the buttress portion 26. Due to forming a straight line in this manner, the slope 46 has a uniform incline angle, such that the direction of airflow can be easily made to follow the slope 46.

Second Air Entry/Exit Promotion Portion

Next, explanation follows regarding the second air entry/exit promotion portion 38.

As illustrated in FIG. 4, the second air entry/exit promotion portion 38 is disposed at an outer side in the tire radial direction (arrow A direction) of the recess portion 34. As illustrated in FIG. 5B, in cross-section the second air entry/exit promotion portion 38 is a concave portion including a slope 52 that is inclined from the surface of the buttress portion 26 toward the bottom portion 40 of the recess portion 34. Note that the slope 52 has a substantially square shape in plan view, and connects smoothly to the bottom portion 40 of the recess portion 34. The slope 52 is an inclined face running from the bottom portion 40 toward the tire surface so as to gradually decrease in depth from the tire surface.

Note that although the slope 52 has a substantially square shape in the present exemplary embodiment, the slope 52 may be another polygonal shape such as a rectangular or trapezoidal shape.

A shortest distance along the slope 52 from the base 40A to the surface of the buttress portion 26 is longer than a shortest distance along the recess side wall 44 from the upper side 40B to the surface of the buttress portion 26.

As illustrated in FIG. 4, a sidewall 54 that has a steeper incline than the slope 52 is formed at the tire rotation direction front side (arrow B direction side) of the slope 52, and a sidewall 56 that has a steeper incline than the slope 52 is formed at the opposite side of the slope 52 to the tire rotation direction front side. Angles formed by the sidewalls 54, 56 with respect to the slope 52 are substantially the same as one another. In the second air entry/exit promotion portion 38 of the present exemplary embodiment, a width dimension (the dimension in a direction intersecting the incline direction of the slope 52) at the tire radial direction outer side is formed relatively smaller than a width dimension at the recess portion 34 side.

A shortest distance along the slope 52 from the bottom side 40A to the surface of the buttress portion 26 is longer than a shortest distance along the recess side wall 44 from the upper side 40B to the surface of the buttress portion 26.

Note that the width of the slope 52 is uniform from the bottom portion 40 of the recess portion 34 toward the tire radial direction outside.

Note that end portions of the sidewall 54 of the second air entry/exit promotion portion 38 and the sidewall 48 of the first air entry/exit promotion portion 36 previously described are connected to one another. Moreover, end portions of the sidewall 50 of the first air entry/exit promotion portion 36 and the recess sidewall 44 of the recess portion 34 are also connected to one another.

The slope 52 has a gentler incline than the recess sidewall 42 and the recess sidewall 44 of the recess portion 34. As illustrated in FIG. 5B, similarly to the incline angle θ1 of the slope 46 of the first air entry/exit promotion portion 36, an incline angle θ2 of the slope 52 with respect to the surface of the buttress portion 26 is preferably set within a range of from 5° to 45°, more preferably set within a range of from 5° to 30°, and still more preferably set within a range of from 15° to 25°. Note that in cross-section the slope 52 forms a straight line running from the upper side 40A to the surface of the buttress portion 26. Due to forming a straight line in this manner, the slope 52 has a uniform incline angle, such that the direction of airflow can be easily made to follow the slope 52.

Figure 5C:
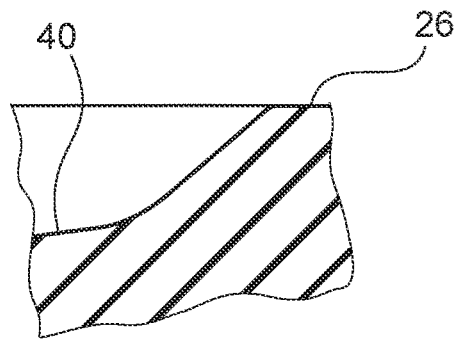
FIG. 5C is a cross-section of the air-cooled portion illustrated in FIG. 4 as sectioned along line 5C-5C.

As illustrated in FIG. 5A and FIG. 5B, the incline angle θ1 of the slope 46 and the incline angle θ2 of the slope 52 are both smaller than an incline angle θ3 of the recess sidewall 42 and an incline angle θ4 of the recess sidewall 44 of the recess portion 34. Note that θ3 and θ4 are preferably both greater than 40°. FIG. 5C is a cross-section of the air-cooled portion 32 illustrated in FIG. 4 as sectioned along line 5C-5C.

In cross-section, the recess sidewall 44 and the recess sidewall 42 each have a rounded profile at a boundary with the surface of the buttress portion 26. This enables distortion of the buttress portion 26 under load to be suppressed. A shortest distance along the slope 46 from the side 40C to the surface of the buttress portion 26 is longer than a shortest distance along the wall portion 42 from the side 40D to the surface of the buttress portion 26.

Operation and Advantageous Effects

Explanation follows regarding operation and advantageous effects of the heavy duty tire 10 of the present exemplary embodiment.

As the heavy duty tire 10 rotates while traveling, the tread 22 repeatedly contacts and moves away from the road surface. The tread 22 therefore undergoes repeated distortion, thereby generating a large amount of heat, particularly at the buttress portion 26.

Moreover, as the heavy duty tire 10 rotates while traveling, a difference in speed arises between the tire surface and the surrounding air, causing air at the tire rotation direction front side of the air-cooled portions 32 to flow into the recess portions 34 of the respective air-cooled portions 32, which are formed at the buttress portions 26, through the first air entry/exit promotion portion 36 at the rotation direction front side as illustrated by the arrow C in FIG. 3. The air that has flowed into the recess portion 34 then flows along the bottom portion 40 of the recess portion 34 so as to cool the bottom portion 40.

The slope 46 of the first air entry/exit promotion portion 36 connects to the bottom portion 40 at a gentler incline than the recess sidewall 42 and the recess sidewall 44 of the recess portion 34. This enables air at the tire rotation direction front side of the recess portion 34 to be smoothly directed along the slope 46 and into the recess portion 34. Moreover, the air that has flowed into the recess portion 34 flows along the bottom portion 40 of, enabling the bottom portion 40 to be effectively cooled. Namely, the air-cooled portion 32 including the first air entry/exit promotion portion 36 promotes the inflow of air toward the recess portion 34 compared to cases in which the first air entry/exit promotion portion 36 is not present, enabling the buttress portion 26 to be more effectively cooled.

Furthermore, as illustrated in FIG. 4, the first air entry/exit promotion portion 36 that causes air to flow into the recess portion 34 is set such that the width dimension at the recess portion 34 side is smaller than the width dimension at the tire surface side at the tire rotation direction front side. The first air entry/exit promotion portion 36 is thereby able to increase the speed at which air is discharged into the recess portion 34 to a greater speed than a speed at which air is taken in from the tire surface side. This enables the speed at which air flows along the bottom portion 40 of the recess portion 34 to be increased, thereby enhancing the cooling effect. The first air entry/exit promotion portion 36 is thus able to cool the buttress portion 26 more effectively than in a case in which the width dimension at the recess portion 34 side is not set smaller than the width dimension at the tire surface side at the tire rotation direction front side.

The air flowing along the bottom portion 40 is then dispelled to the tire exterior along the slope 52 of the second air entry/exit promotion portion 38 disposed at the outer side in the tire radial direction of the recess portion 34, thereby enabling air that has flowed in from the tire rotation direction front side to be dispelled to the tire outside in turn. Thus, the air-cooled portion 32 promotes the inflow of air into the recess portion 34 compared to cases in which the second air entry/exit promotion portion 38 is not present, enabling the buttress portion 26 to be more effectively cooled.

Note that if the incline angle θ1 of the slope 46 of the first air entry/exit promotion portion 36 were greater than 45°, it would be difficult to redirect the air flowing along the tire surface so as to follow the slope 46. If the incline angle θ1 of the slope 46 of the first air entry/exit promotion portion 36 were smaller than 5°, the cooling effect would be diminished. Note that the incline angle θ1 of the slope 46 with respect to the tire surface is more preferably set within a range of from 5° to 30°, and still more preferably set within a range of from 15° to 25°.

As illustrated in FIG. 4, in the air-cooled portion 32 of the present exemplary embodiment, an end portion at the recess portion 34 side of the slope 46 of the first air entry/exit promotion portion 36 is coupled to the entire side 40C at the tire rotation direction front side of the bottom portion 40 of the recess portion 34. Thus, air that has flowed in through the first air entry/exit promotion portion 36 can be made to flow in across the entire width of the bottom portion 40, enabling the bottom portion 40 to be effectively cooled.

In the air-cooled portion 32 of the present exemplary embodiment, the width dimension W1 at the tire rotation direction front side, this being the air inflow side, of the first air entry/exit promotion portion 36 is set larger than the width dimension W2 of the recess portion 34. This enables a large amount of air to be introduced, and enables the rate of air flowing into the recess portion 34 to be increased, enabling the cooling effect at the bottom portion 40 of the recess portion 34 to be improved compared to cases in which the width dimension W1 at the tire rotation direction front side of the first air entry/exit promotion portion 36 is set equal to or less than the width dimension W2 of the recess portion 34.

As the heavy duty tire 10 rotates, the temperature of the tread 22 is liable to rise in the vicinity of the belt 14 where the width of the belt 14 is at its maximum, namely, in the vicinity of the tire width direction end portion 16Be of the protective belt 16B where the width of the belt 14 configuration is at its maximum.

In the present exemplary embodiment, the bottom portion 40 of the recess portion 34 of the air-cooled portion 32 is disposed at the tire width direction outer side of the tire width direction end portion 16Be of the protective belt 16B, and is positioned near to the tire width direction end portion 16Be where the temperature is most liable to rise. This enables heat generated near to the tire width direction end portion 16Be to be effectively dissipated to the tire exterior through the bottom portion 40 of the recess portion 34, enabling the rise in temperature near to the tire width direction end portion 16Be of the maximum width protective belt 16B to be effectively suppressed.

Moreover, in the heavy duty tire 10 of the present exemplary embodiment, the tire width direction end portion 16Be of the protective belt 16B is positioned at the inner side in the tire width direction of the tire radial direction central portion of the bottom portion 40 of the recess portion 34, thereby enabling a tire radial direction inner side portion and tire radial direction outer side portion of the tire width direction end portion 16Be to be evenly cooled.

When the load borne by the heavy duty tire 10 increases, distortion near to the belt end increases accordingly, such the amount of heat generated near to the belt end also increases. However, in the heavy duty tire 10 of the present exemplary embodiment, the first air entry/exit promotion portion 36 and the second air entry/exit promotion portion 38 are linked to the recess portion 34. Furthermore, the width of the first air entry/exit promotion portion 36 is set such that the width dimension at the recess portion 34 side is smaller than the width dimension of the tire surface side at the air inflow side, thereby increasing the rate at which air flows into the recess portion 34. This enables the buttress portion 26 to be efficiently cooled, thereby enabling the rise in temperature in the vicinity of the belt end to be effectively suppressed.

Note that since the surface area of the first air entry/exit promotion portion 36 and surface area of the second air entry/exit promotion portion 38 when combined are greater than the surface area of the recess portion 34 when viewed in plan view, the inflow and outflow of air to and from the recess portion 34 can be promoted compared to cases in which the combined surface area is equal to or less than the surface area of the recess portion 34.

Other Exemplary Embodiments

An exemplary embodiment of the present invention has been described above. However, the present invention is not limited to the above description, and obviously various other modifications may be implemented within a range not departing from the scope of the present invention.

In the above exemplary embodiment, the first air entry/exit promotion portion 36 is disposed at the tire rotation direction front side of the recess portion 34 and the second air entry/exit promotion portion 38 is disposed at the outer side in the tire radial direction of the recess portion 34. However, the positions where the first air entry/exit promotion portion 36 and the second air entry/exit promotion portion 38 are disposed with respect to the recess portion 34, the number of first air entry/exit promotion portions 36 and second air entry/exit promotion portions 38, and the width of the first air entry/exit promotion portion 36 are not limited those described in the above exemplary embodiment.

Explanation follows regarding modified examples in which the positional relationships and so on of the recess portion 34, the first air entry/exit promotion portion 36, and the second air entry/exit promotion portion 38 have been modified. FIGS. 6A and 6B, and FIGS. 7A and 7B are schematic diagrams of air-cooled portions 32, each illustrating only the bottom portion and the slopes thereof.

Figure 6A:
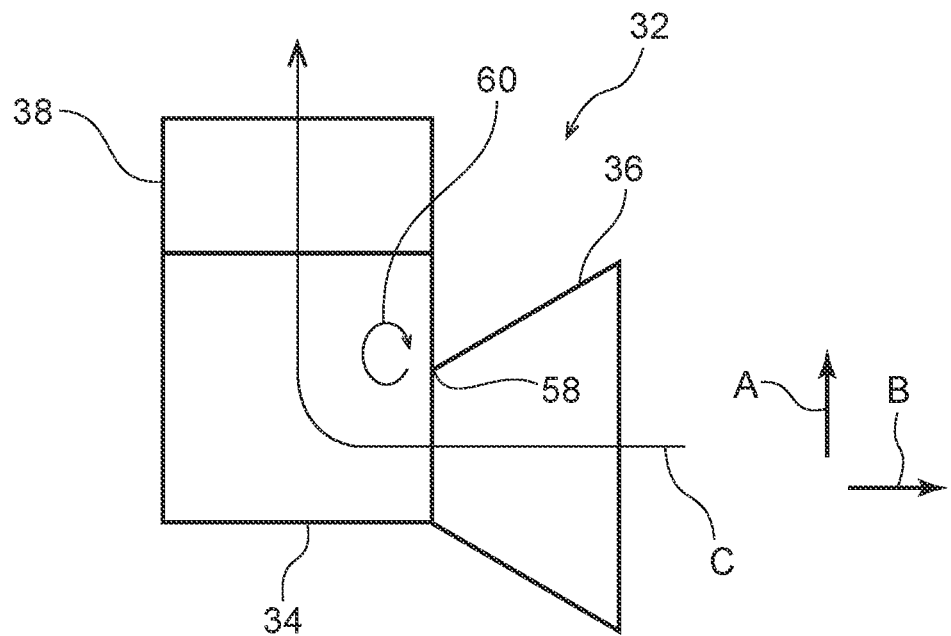
FIG. 6A is a plan view illustrating a modified example of an air-cooled portion.
Figure 6B:
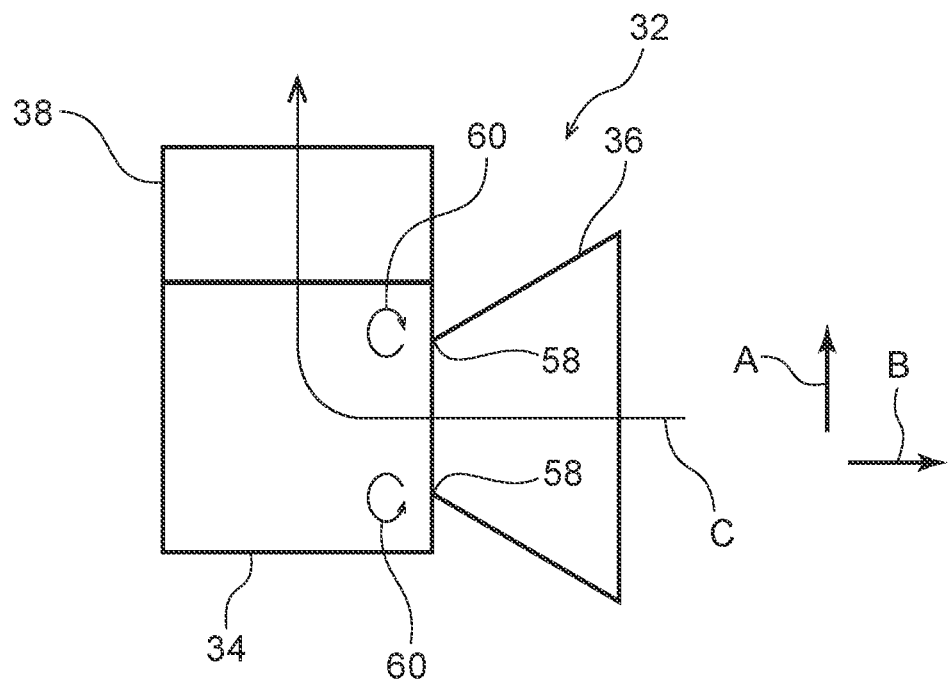
FIG. 6B is a plan view illustrating a modified example of an air-cooled portion.

As illustrated in FIG. 6A and FIG. 6B, in the air-cooled portion 32, the width of the first air entry/exit promotion portion 36 on the recess portion 34 side may be narrower than the width of the recess portion 34. A corner portion 58 is thereby formed at a connection portion between the first air entry/exit promotion portion 36 and the recess portion 34. The flow of air undergoes a sudden change due to this corner portion 58, such that a turbulent flow 60 is generated inside the recess portion 34 so as to agitate the air inside the recess portion 34, enabling the cooling efficiency to be further improved.

Figure 7A:
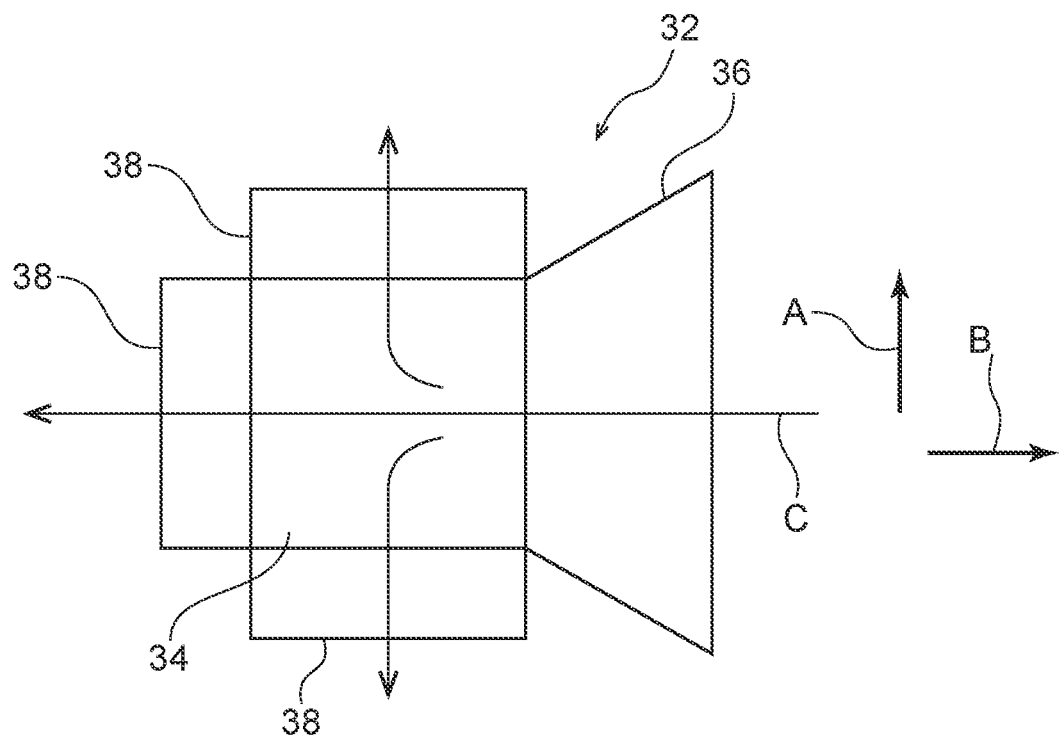
FIG. 7A is a plan view illustrating a modified example of an air-cooled portion.

As illustrated in FIG. 7A, second air entry/exit promotion portions 38 may be provided at an outer side in the tire radial direction, an inner side in the tire radial direction, and the tire rotation direction rear side of the recess portion 34 of the air-cooled portion 32.

Figure 7B:
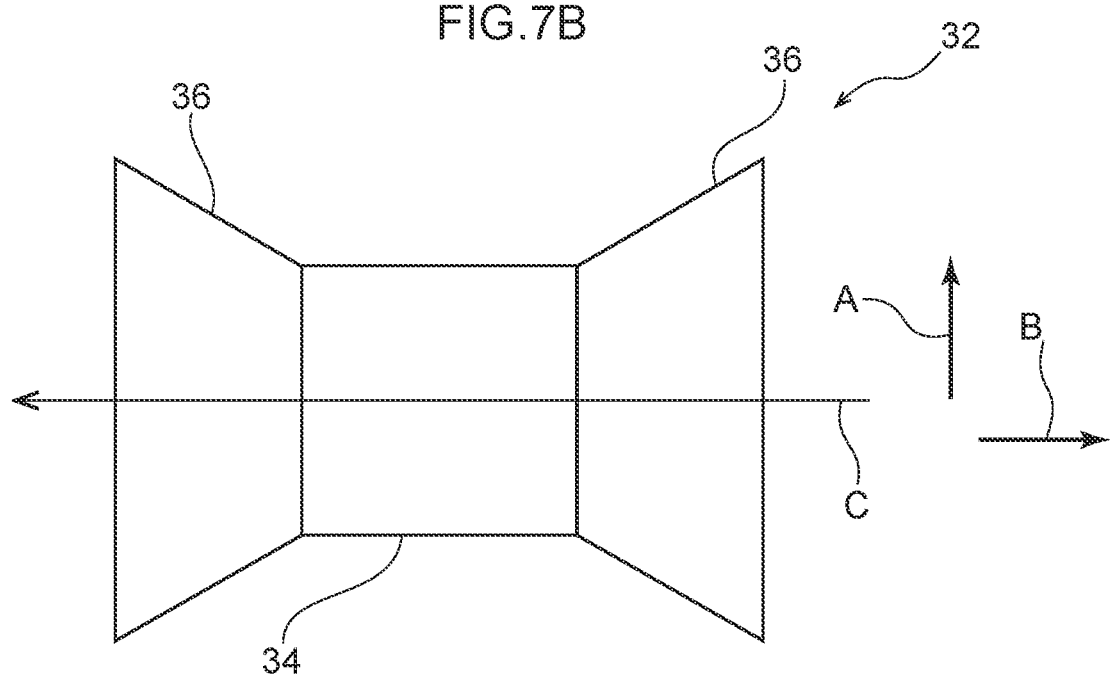
FIG. 7B is a plan view illustrating a modified example of an air-cooled portion.

As illustrated in FIG. 7B, first air entry/exit promotion portions 36 may be provided at both the tire rotation direction front side and the tire rotation direction rear side of the recess portion 34 of the air-cooled portion 32.

Figure 8:
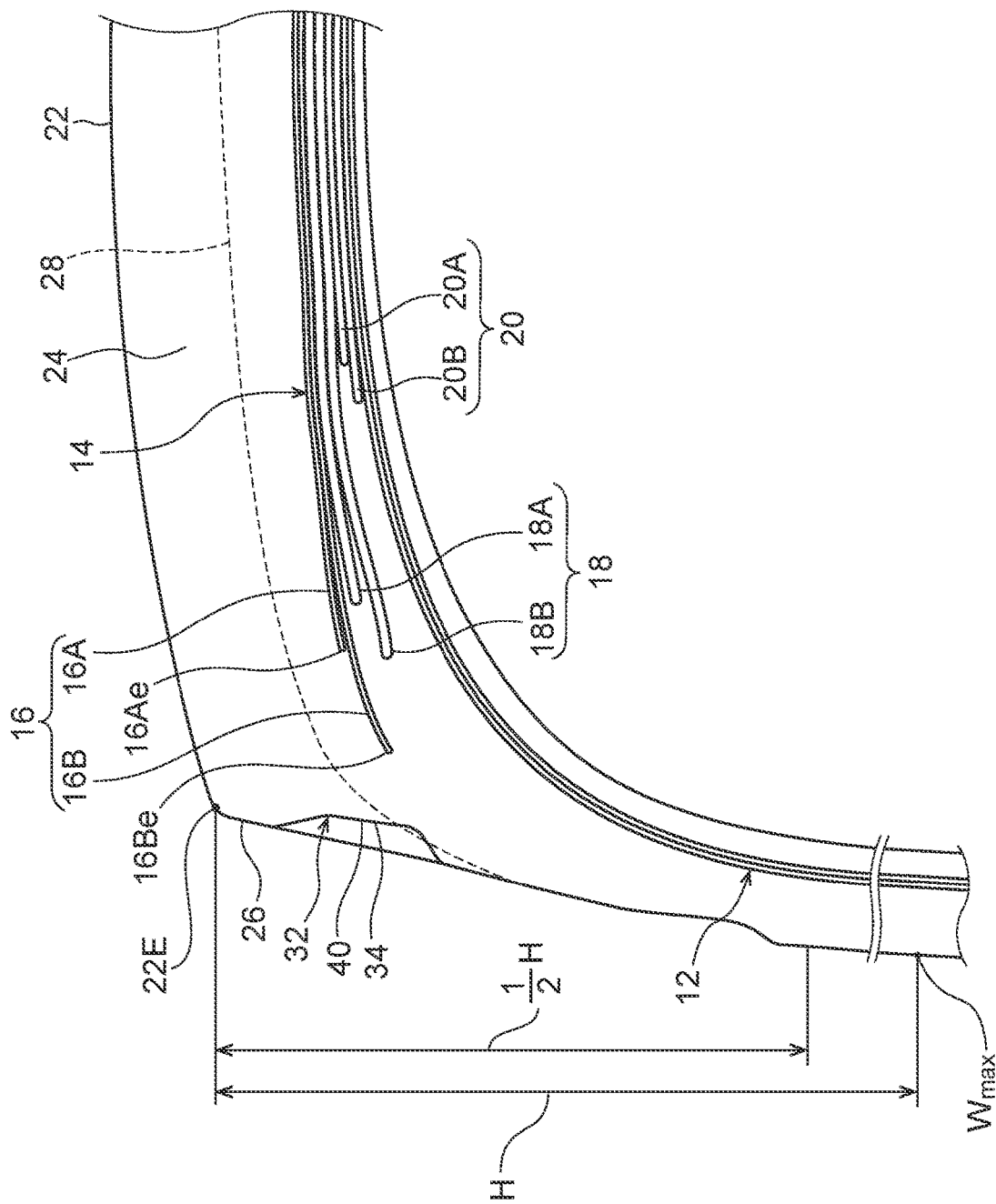
FIG. 8 is a cross-section illustrating the vicinity of a buttress portion of a heavy duty tire according to another exemplary embodiment.

Although the bottom portion 40 of the recess portion 34 is not positioned at the outer side in the tire width direction of a tire width direction end 16Ae of the protective belt 16A, which is disposed at the tire radial direction outermost side of the belt 14 in the above exemplary embodiment, as illustrated in FIG. 8, the bottom portion 40 may be extended toward the tire radial direction outer side such that the bottom portion 40 of the recess portion 34 is positioned at ab outer side in the tire width direction of the tire width direction end 16Ae of the protective belt 16A at the outermost side.

Cracks may develop at the surface of the tread 22 when the heavy duty tire 10 travels along rough roads or the like. When heat is generated such that the temperature rises in the vicinity of the tire width direction end 16Ae of the protective belt 16A at the tire radial direction outermost side, the durability of the tread rubber 24 surrounding the vicinity of the tire width direction end 16Ae is reduced, and cracks that have developed on the surface of the tread 22 might advance toward the rubber portion where the durability is reduced.

As illustrated in FIG. 8, disposing the bottom portion 40 of the recess portion 34 at the outer side in the tire width direction of the tire width direction end 16Ae of the protective belt 16A at the tire radial direction outermost side enables the bottom portion 40 to be brought closer to the tire width direction end 16Ae. This enables the rise in temperature near to the tire width direction end 16Ae to be suppressed, enabling the durability of the tread rubber 24 near to the tire width direction end 16Ae to be maintained, and enabling cracks at the surface of the tread 22 to be suppressed from advancing toward the tread rubber 24 near to the tire width direction end 16Ae.

Figure 9:
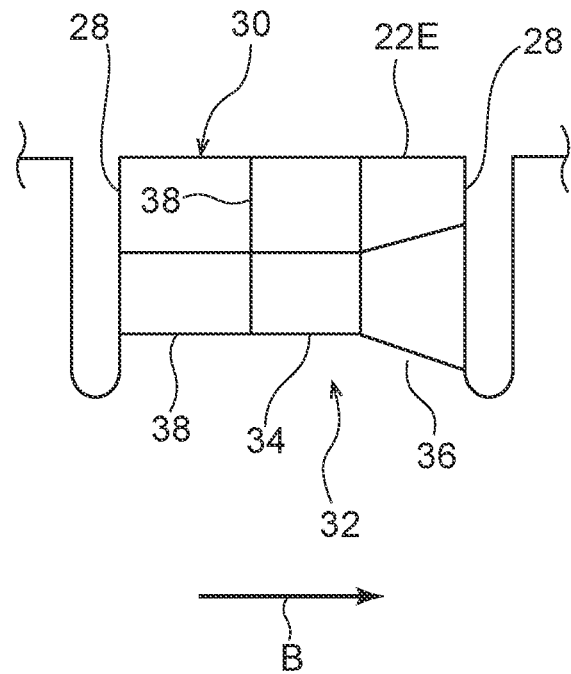
FIG. 9 is a plan view illustrating a modified example of an air-cooled portion.
Figure 10:
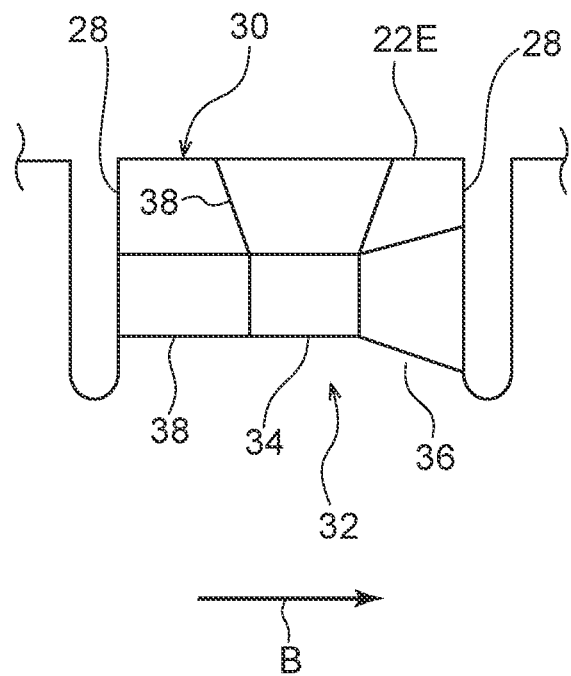
FIG. 10 is a plan view illustrating a modified example of an air-cooled portion.

Although the end portion of the first air entry/exit promotion portion 36 at the opposite side from the recess portion 34 side terminates at the surface of the buttress portion 26 in the above exemplary embodiment, as illustrated in FIG. 9 the end portion of the first air entry/exit promotion portion 36 at the opposite side from the recess portion 34 side may be linked to (open to) a lug groove 28. This enables air in the lug groove 28 to be made to flow into the recess portion 34 in addition to air from the tire side face. Although the end portion of the second air entry/exit promotion portion 38 at the opposite side from the recess portion 34 side terminates at the surface of the buttress portion 26 in the above exemplary embodiment, as illustrated in FIG. 9 the end portion of the second air entry/exit promotion portion 38 at the opposite side from the recess portion 34 side may be linked to (open to) a lug groove 28 or a tread end. Alternatively, as illustrated in FIG. 10, a second air entry/exit promotion portion 38 linked to a tread end may be formed so as to widen on progression toward the tread end.

The entire content of the disclosure of Japanese Patent Application No. 2017-237703 filed on Dec. 12, 2017 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A heavy duty tire comprising:
a recess portion formed at a buttress portion, opening toward an outside of the tire, and including a bottom portion; and
an air entry/exit promotion portion configured to promote entry and exit of air into and from the bottom portion, the air entry/exit promotion portion including a slope that extends from the bottom portion toward a tire surface such that a depth of the slope from the tire surface gradually decreases,
wherein a width dimension of the air entry/exit promotion portion at a recess portion side is smaller than a width dimension of the air entry/exit promotion portion at an opposite side from the recess portion side, and
the air entry/exit promotion portion is at least formed at a side in a tire rotation direction of the recess portion.

2. The heavy duty tire of claim 1, wherein another air entry/exit promotion portion is formed at a side in a tire radial direction of the recess portion.

3. The heavy duty tire of claim 1, wherein the air entry/exit promotion portion is formed at at least two locations, which include a front side in the tire rotation direction of the recess portion, and a different side from the front side in the tire rotation direction of the recess portion.

4. The heavy duty tire of claim 1, wherein an average incline angle of the slope with respect to the tire surface is from 5° to 45°.

5. The heavy duty tire of claim 1, wherein an end portion of the slope at the recess portion side is linked to an entire side of the bottom portion of the recess portion that is linked to the slope.

6. The heavy duty tire of claim 1, wherein a width dimension of the slope at a tire surface side is larger than a maximum width dimension of the recess portion.

7. The heavy duty tire of claim 1, wherein an end in a tire width direction of a maximum width belt ply, which configures a belt, is positioned at an inner side in the tire width direction of the bottom portion of the recess portion.

8. The heavy duty tire of claim 7, wherein the end in the tire width direction of the maximum width belt ply is positioned at a central portion in a tire radial direction of the bottom portion and at the inner side in the tire width direction of the bottom portion.

9. The heavy duty tire of claim 1, wherein an end in a tire width direction of a belt ply, which is located at an outermost side in a tire radial direction and which configures a belt, is positioned at an inner side in the tire width direction of the bottom portion of the recess portion.

10. The heavy duty tire of claim 1, wherein a total surface area of the air entry/exit promotion portion when viewed in plan view is larger than a surface area of the recess portion when viewed in plan view.

* * * * *